United States Patent [19]

Ray

[11] Patent Number: 4,735,922

[45] Date of Patent: Apr. 5, 1988

[54] POROUS REFRACTORY HARD METAL COMPOSITIONS AND METHOD OF FORMING SAME

[75] Inventor: Siba P. Ray, Plum Boro, Pa.

[73] Assignee: Aluminum Company of America, Pittsburgh, Pa.

[21] Appl. No.: 789,436

[22] Filed: Oct. 21, 1985

Related U.S. Application Data

[63] Continuation-in-part of Ser. No. 604,913, Apr. 27, 1984, which is a continuation-in-part of Ser. No. 423,673, Sep. 27, 1982, Pat. No. 4,454,015.

[51] Int. Cl.$^4$ .................... C04B 38/04; C04B 35/56; C04B 35/58
[52] U.S. Cl. .................................. 501/80; 501/87; 501/88; 501/96; 501/97; 501/98; 501/103; 501/132
[58] Field of Search .............. 501/80, 87, 96, 97, 501/98, 103, 127, 88, 132

[56] References Cited

U.S. PATENT DOCUMENTS

| | | | |
|---|---|---|---|
| 3,143,413 | 8/1964 | Krapf | 501/87 |
| 4,500,643 | 2/1985 | Gesing et al. | 204/67 |
| 4,540,475 | 9/1985 | DeAngelis | 204/291 |

Primary Examiner—Mark L. Bell
Attorney, Agent, or Firm—Andrew Alexander; John P. Taylor

[57] ABSTRACT

A porous refractory hard metal composition is disclosed which is formed by removing the metal compound from a substantially interwoven matrix composition comprising one or more refractory hard metals and a metal compound. The interwoven matrix composition, in a preferred embodiment, may comprise $Al_2O_3$ and $TiB_2$, $ZrB_2$, or a mixture of the two refractory hard metals.

20 Claims, 1 Drawing Sheet

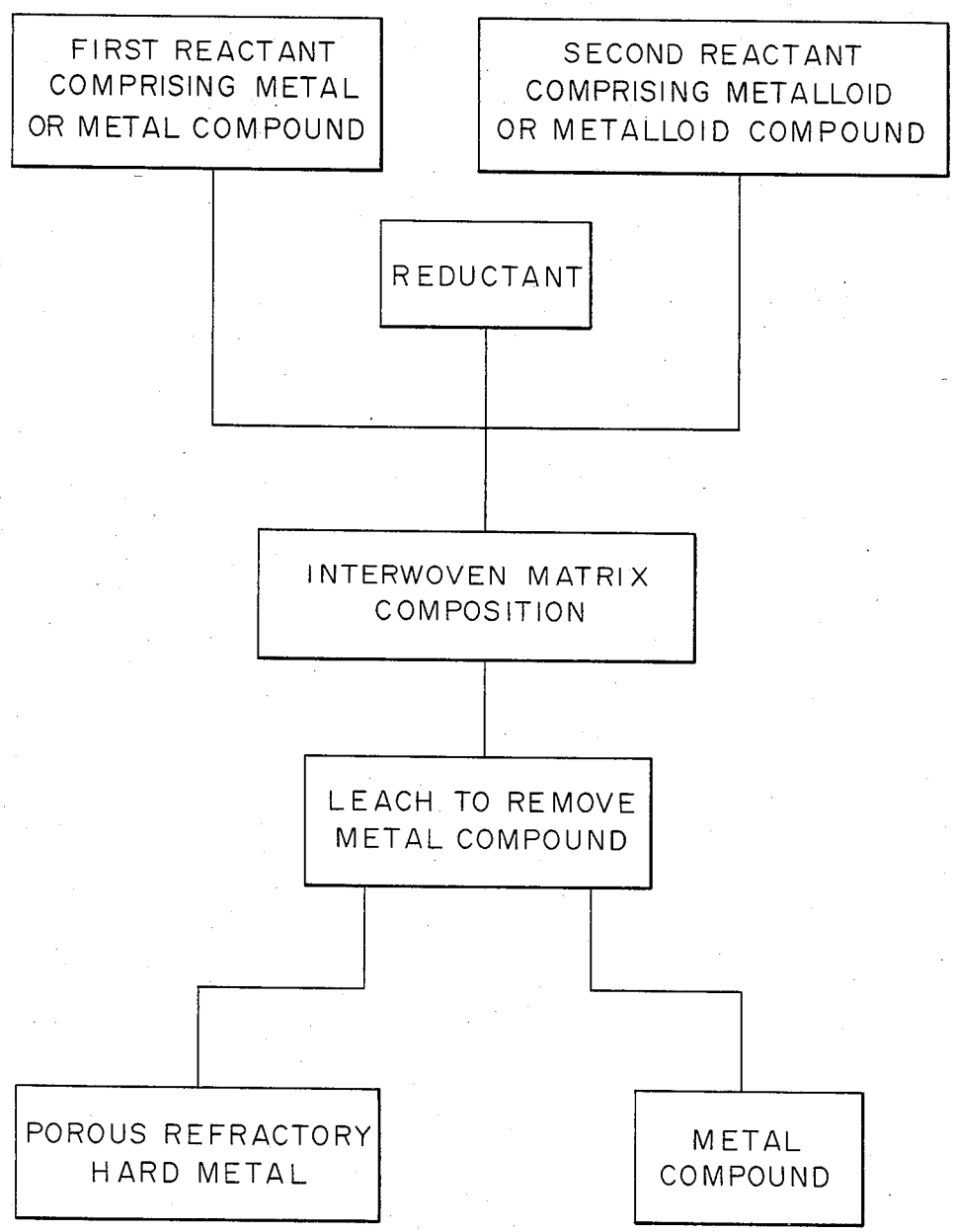

POROUS REFRACTORY HARD METAL COMPOSITIONS AND METHOD OF FORMING SAME

CROSS-REFERENCE TO RELATED APPLICATIONS

This application is a continuation-in-part of application Ser. No. 604,913 filed Apr. 27, 1984, pending which is a continuation-in-part of application Ser. No. 423,673, filed Sept. 27, 1982, and now issued as U.S. Pat. No. 4,454,015 on June 12, 1984.

BACKGROUND OF THE INVENTION

1. Field of the Invention

This invention relates to porous refractory hard metal compositions. More particularly, this invention relates to a porous refractory hard metal composition formed from a substantially interwoven matrix composition comprising a refractory hard metal and a metal compound.

2. Description of the Prior Art

Refractory hard metals, such as $TiB_2$ or $ZrB_2$ are useful in applications where a material is needed possessing chemical inertness and/or mechanical strength, particularly at elevated temperatures. Porous materials comprising refractory hard metals would be particularly useful for filtering molten metals or, especially at elevated temperatures, corrosive materials such as molten salts, because of the chemical inertness and mechanical strength of a refractory hard metal.

The interest in the use of $TiB_2$ as an electrode or electrode surface, for an electrolytic cell has generated great interest in ways to economically produce such a product in a form that could be used as a cathode. For example, U.S. Pat. No. 4,353,885 discloses forming $TiB_2$ by vapor phase reaction. Additionally, U.S. Pat. No. 3,016,288 discloses an aluminothermic process of making boron compounds and alloys.

Walton et al in "Cermets From Thermite Reactions", published January, 1959, in Volume 42 of the *Journal of the American Ceramic Society*, at pages 40–49, discusses thermite reactions for forming materials such as $ZrSi_2$, by the reduction of either $ZrSiO_4$ or $ZrO_2$ and $SiO_2$, and $TiB_2$, by the reduction of $TiO_2$ and $B_2O_3$.

One factor which has limited the utilization of refractory hard metals is the high cost normally involved in producing such materials. Thus, in order to obtain the benefits of such a material, it can be seen that there is a great need for a process which would provide refractory hard metals such as $TiB_2$ at an economically feasible cost.

An article entitled "Displacement Reactions in the Solid State", by R. A. Rapp et al, published May 1973, in Volume 4 of *Metallurgical Transactions* at pages 1283–1292, points out the different morphologies which can result from the addition of a metal or metal alloy to an oxide mixture. The authors show that some additions result in layers of metal or metal oxides while others form aggregate arrangements which may be lamellar or completely interwoven. An example of an interwoven structure is shown for the reaction of Fe with NiO which produces a NiFe alloy/FeO structure. The authors suggest that interwoven-type microstructures should be ideal for the transfer of stresses and resistance of crack propagation and demonstrated that such were not fractured by rapid cooling. The authors further suggested that such an interwoven structure would be useful in the preparation of porous electrodes for fuel cells or catalysts for reactions between gases by selective dissolution of either the metal or the oxide phase.

In my parent U.S. patent application Ser. No. 604,913, there is disclosed a novel composition in which a refractory hard metal, such as $TiB_2$, is formed in an interwoven matrix with a metal compound by a displacement reaction using first and second reactants which form the refractory hard metal and a third reactant which forms a metal compound. These reaction products are substantially uniformly dispersed in the resulting interwoven matrix composition. This invention relates to a porous refractory hard metal composition formed from such a substantially interwoven matrix and a method of making such porous refractory hard metal compositions by removing the metal compound from the interwoven matrix composition.

SUMMARY OF THE INVENTION

It is, therefore, an object of the present invention to provide a porous refractory hard metal composition.

It is another object of the invention to provide a porous refractory hard metal composition formed from a substantially interwoven matrix composition comprising a refractory hard metal and a metal compound.

It is yet another object of the present invention to provide a porous refractory hard metal composition formed from a substantially interwoven matrix composition comprising a refractory hard metal and a metal compound produced by a displacement reaction.

It is a further object of the present invention to provide a method for making a porous refractory hard metal composition formed from a substantially interwoven matrix composition comprising a refractory hard metal and a metal compound.

These and other objects of the invention will be apparent from the following description and accompanying drawing.

In accordance with the invention, a porous refractory hard metal material is produced from a substantially interwoven matrix composition comprising a refractory hard metal and a metal compound formed by a displacement reaction by removing the metal compound from the interwoven matrix.

BRIEF DESCRIPTION OF THE DRAWING

The sole FIGURE is a flowsheet illustrating the invention.

DETAILED DESCRIPTION OF THE INVENTION

The invention comprises a porous refractory hard metal composition formed by removing, e.g., by leaching, a metal compound which is formed when producing the refractory hard metal via a displacement reaction to form a substantially interwoven matrix composition comprising the refractory metal and the metal compound.

The substantially interwoven matrix compositions suitable for use in making the porous refractory hard metal composition of the invention may be formed by reacting together a first reactant and a second reactant in the presence of a third reactant to provide a reaction wherein the reactants combine to form an interwoven matrix composition of a conductive material and an insulating material. In a preferred embodiment, the first reactant is a metal or a metal compound; the second reactant is a metal or a metal compound; and the third reactant is a material capable of being oxidized.

In a particularly preferred embodiment, the first reactant is a metal or a metal compound; the second reactant is a metalloid or a compound formed from a metalloid; and the third reactant is a reductant such that the reactants form a substantially interwoven matrix of a refractory hard metal and a metal compound. The term "metalloid" is herein defined to include boron, nitrogen, carbon, silicon, and sulfur.

The first reactant is preferably selected from the class consisting of a metal; and oxides, carbides, nitrides, and silicides of metals. The second reactant is typified by silicon, boron, carbon, nitrogen, and the like or their compounds, e.g., oxides of silicon and boron and nitrides of sodium and potassium. The third reactant is preferably selected from Al, Mg, Ca, Ba, and the like. In accordance with a preferred embodiment of the invention, the metal compound, e.g., metal oxide, resulting from the reaction is dispersed throughout the refractory hard metal thereby forming an interwoven matrix with the refractory hard metal resulting in a composition having a high level of conductivity.

The metals or metal compound reactants useful in the invention include those metals and metal compounds which react to form or provide a refractory hard metal dispersed through the reaction product with other compounds resulting from the reaction. In a particularly preferred embodiment of the invention in which a titanium diboride or zirconium diboride refractory hard metal is interwoven with aluminum oxide, the first reactant may comprise metallic titanium or zirconium, TiO, ZrO, TiO$_2$, or ZrO$_2$; the second reactant may be boron oxide; and the third reactant may be metallic aluminum.

Some of the possible reactions for this embodiment are illustrated as follows:

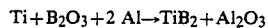

$$Ti + B_2O_3 + 2\ Al \rightarrow TiB_2 + Al_2O_3$$

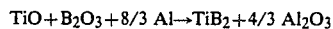

$$TiO + B_2O_3 + 8/3\ Al \rightarrow TiB_2 + 4/3\ Al_2O_3$$

$$TiO_2 + B_2O_3 + 10/3\ Al \rightarrow TiB_2 + 5/3\ Al_2O_3$$

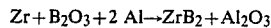

$$Zr + B_2O_3 + 2\ Al \rightarrow ZrB_2 + Al_2O_3$$

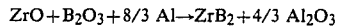

$$ZrO + B_2O_3 + 8/3\ Al \rightarrow ZrB_2 + 4/3\ Al_2O_3$$

$$ZrO_2 + B_2O_3 + 10/3\ Al \rightarrow ZrB_2 + 5/3\ Al_2O_3$$

In each instance, heat of reaction is also given off. It has been found that the higher the heat of reaction, the larger the pore size. While such reactions are illustrated in stoichiometrically balanced equations which provide stoichiometrically balanced compounds, it will be understood that the use of non-stoichiometric compounds are contemplated within the purview of the invention. Further, the ratio of TiB$_2$ or ZrB$_2$ to Al$_2$O$_3$ in the interwoven matrix product can be varied, as will be noted herein, and such is also contemplated within the invention.

The term "refractory hard metal", as used herein, is intended to define compounds, such as metal nitrides, borides, carbides, silicides, or sulfides, or their mixtures, formed by reacting a metalloid, or a metalloid compound, with a refractory metal or a refractory metal compound, such as, for example, titanium, zirconium, hafnium, chromium, titanium oxide, zirconium oxide, etc., or mixtures thereof.

The initial reactants, used to form the substantially interwoven matrix composition utilized in the invention, should comprise 15 to 48 mol. % of metals or metal oxides, e.g., titanium or zirconium, oxides of titanium or zirconium, or alumina. In a preferred embodiment, the reactants may comprise 15 to 25 wt. % oxides of titanium or zirconium, 18 to 25 mol. % B$_2$O$_3$, and 50 to 70 mol. % aluminum. The reactants can be initially blended by mixing powders of the reactant and reductants and compacting them to pressures in the range of 5,000 to 40,000 psi. The initial reactants may also be formed into the desired shape, e.g., an electrode for a Hall cell by using isostatic pressing techniques well known to those skilled in the art.

The porous refractory hard metal composition of the invention may be formed from an interwoven matrix composition which comprises more than one refractory hard metal interwoven with a metal compound such as Al$_2$O$_3$. For example, in my copending application Ser. No. 789,438, entitled "COMPOSITES COMPRISING ONE OR MORE INTERWOVEN MATRIX COMPOSITION EACH CONTAINING A REFRACTORY HARD METAL AND METHOD OF MAKING SAME", filed on Oct. 21, 1985 and assigned to the assignee of this invention, cross-reference to which is hereby made, (hereinafter referred to as my copending "coreactants" application) I describe and claim formation of such a mixture by physically mixing together two previously formed compositions, each comprising a different substantially interwoven matrix composition comprising a refractory hard metal and a metal compound. I also describe and claim in that application the formation of the mixture in situ, by mixing together the components which will react to form the compositions which each comprise a substantially interwoven matrix of a refractory hard metal and a metal compound.

One of the advantages of forming the porous refractory hard metal composition from a substantially interwoven matrix material containing more than one refractory hard metal is that the in situ formation of more than one refractory hard metal in the interwoven matrix composition may provide a temperature control to control the amount of exothermic heat released as the reaction proceeds to form the interwoven matrix composition. For example, the reaction between TiO$_2$, B$_2$O$_3$, and aluminum is very exothermic and releases large quantities of heat. In some instances, the excessive amount of heat released during the exothermic reaction to form an interwoven matrix composition of, for example, TiB$_2$ and Al$_2$O$_3$ will result in distortion or warping of the shape of a green ceramic initially formed from a mixture of the reactants prior to the exothermic reaction to form the interwoven matrix composition.

However, if such reactants are mixed, prior to the displacement reaction, with other reactants which also react to form an interwoven matrix, but with release of less exothermic heat, the resultant mixture of two or more interwoven matrix compositions, each of which comprises an interwoven matrix of a refractory hard metal and a metal compound, may be formed without distortion or warping of the final product.

Thus, for example, if the reactants which will, respectively form interwoven matrices of ZrB$_2$ and Al$_2$O$_3$, and TiO$_2$ and Al$_2$O$_3$ are mixed together in amounts which will form, upon subsequent reaction, ratios in a composite of from 20 wt. % TiB$_2$/80 wt. % ZrB$_2$ to 80 wt. % TiB$_2$/20 wt. % ZrB$_2$, the excessive amount of exothermic heat generated by the reaction to form the $TiB_2$ may be controlled due to the lessor amount of heat liberated by the exothermic reaction to form the $ZrO_2$ interwoven matrix whereby the shape of the resulting composite will not be distorted or warped as might be a product formed using only the $TiB_2$ reactants.

The displacement reaction to form the substantially interwoven matrix may be locally initiated by exposing a selected portion, such as an end of the compact, to a temperature sufficient to initiate the exothermic reaction. Such local initiation is described in more detail in my copending application Ser. No. 789,435, entitled "METHOD OF FORMING A SUBSTANTIALLY INTERWOVEN MATRIX CONTAINING A REFRACTORY HARD METAL", And A Metal Compound filed on Oct. 21, 1981 and assigned to the assignee of this invention, cross reference to which is hereby made, (hereinafter referred to as my copending "local initiation" application). In that application I have described and claimed methods for locally initiating an exothermic displacement reaction wherein the exothermic heat generated is then used to sustain the reaction through the remainder of the material. The use of such a method has distinct advantages such as conservation of heat energy used in producing such compositions as well as more rapid cool down when the heat is mainly internally generated.

The heat to locally initiate the reaction may, for example, be supplied by a local resistance heater, by directing a source of heated gas or hot air at the formed object, or by using an inductive coil. Additional heat, of course, supplied to the entire body, may be used to supplement the locally generated exothermic heat, if necessary. This may be particularly important if the particular reactants do not generate sufficient exothermic heat to sustain the displacement reaction.

Preferably, however, the reactants used to form the interwoven matrix composition are chosen to avoid the need for such supplemental heat since by relying solely on exothermic heat, the entire process is speeded up since the time for residual cooling of a large furnace containing the entire formed object is eliminated.

The reactants may be hot pressed to form a shaped object comprising the desired shape of the porous refractory hard metal composition of the invention while locally initiating the reaction as just described. In this method, the powdered initial reactants are uniaxially pressed at a pressure of about 1,000 to 25,000 psi, for example, for about 15 minutes to one hour while the reaction is initiated. This pressure is then continued until the reaction is completed. Care must be exercised, however, in the selection of die materials which will be inert to the reaction taking place within the dies during the formation of the shaped object. It should be further noted here that hot isostatic pressing can also be used in this connection.

After the interwoven matrix composition is formed, in accordance with the invention, the metal compound is removed leaving only the refractory hard metal. Since the materials were formed in a substantially interwoven matrix, removal of the metal compound leaves behind a porous refractory hard metal material.

The metal compound is removed by immersing the interwoven matrix composition in a liquid which is a solvent for the metal compound. In the preferred embodiment, where the metal compound comprises $Al_2O_3$, the interwoven matrix composition may be immersed in molten cryolite ($Na_3AlF_6$) or any other molten fluoride salt which is capable of dissolving out the aluminum oxide in the interwoven matrix. The molten solvent is maintained at a temperature of from at least about 200° C. up to about 1000° C. Temperatures higher than about 1000° C. should be avoided to insure not damaging the refractory hard metal. The interwoven matrix composition is immersed in the molten solvent for about 10 to 50 hours, preferably about 24 hours and is preferably gently turned or agitated in the solvent to expedite the leaching process. The porous refractory hard metal composition is then removed from the solvent bath and allowed to cool after which it is rinsed and dried.

Porous refractory hard metal compositions made in the foregoing manner have been found to have a porosity range of from 0.5 to 0.01 cc/gram. Control of the porosity size range may be achieved by control of the particle size of the initial ingredients used in forming the interwoven matrix composition. The porosity is also controlled by the composition of the reaction mix. For example, if the initial reactants have some volatile components or adsorbed gases which go off during reaction, porosity would be generated. The pore size may also be controlled by controlling the temperature used to form the ceramic prior to initiation or the temperature at which the shaped object is held during or after the displacement reaction. For example, if a temperature of about 1800° C. is used, the resultant pore volume will be about 0.01 cc/gram. However, if no additional heat is introduced into the system, the resultant porosity will increase to 0.1 to 0.2 cc/gram in the cases of, for example, $TiB_2$-$Al_2O_3$-$ZrO_2$, $ZrB_2$-$Al_2O_3$, $ZrB_2$-$ZrC$-$Al_2O_3$, or $ZrB_2$-$TiB_2$-$ZrC$-$Al_2O_3$ composites formed by this process.

The following examples will serve to further illustrate the invention.

EXAMPLE I

Four rectangular plates containing a mixture of 20 wt. % of $ZrO_2$ powder and 80 wt. % of a mixture containing 43.6 wt. % $ZrO_2$, 24.6 wt. % $B_2O_3$, and 31.8 wt. % aluminum powder were pressed at 15,000 psi to form four green compacts. The weight and density of the four green compact samples were as follows:

TABLE I

| Sample No. | Weight (grams) | Density (grams/cc) |
|---|---|---|
| 1 | 79.94 | 2.51 |
| 2 | 80.06 | 2.51 |
| 3 | 80.13 | 2.51 |
| 4 | 80.12 | 2.51 |

The plates were then placed in a graphite crucible with 5 grams of $ZrO_2$ powder placed between the plates. The end of the plates did not contact the graphite crucible. The crucible was placed in a furnace and heated in an argon atmosphere. At 1050° C., an exothermic reaction took place and the temperature increased to 1230° C. The temperature of the furnace was then raised to 1920° C. and then the furnace was shut off. The inert gas was allowed to continue flowing until the furnace reached ambient temperature, the samples were then removed. One of the samples was then analyzed for pore volume and size. The total pore volume in this sample was 0.1640 cc/gram with a median pore diameter of 54 microns.

EXAMPLE II

Four rectangular plates containing a mixture of 20 wt. % $ZrO_2$ powder and 80 wt. % of a mixture of 33.37 wt. % $TiO_2$, 29.07 wt. % $B_2O_3$, and 37.56 wt. % Aluminum powder were pressed at 15,000 psi. The weight and density of the four green compact samples were as follows:

TABLE II

| Sample No. | Weight (grams) | Density (grams/cc) |
|---|---|---|
| 1 | 75.028 | 2.24 |
| 2 | 75.11 | 2.24 |
| 3 | 75.095 | 2.25 |
| 4 | 75.068 | 2.25 |

The samples were placed in an aluminum crucible and placed inside a furnace and heated in an argon atmosphere. Argon gas was flowed through the furnace at 325 cc/minute while the furnace was heated to a temperature of about 937° C. when an exothermic reaction took place. The temperature suddenly rose to 1202° C. Additional power was then supplied to the furnace to raise the temperature within the furnace to 1500° C. The furnace was then shut off and allowed to cool. When the furnace and the samples had cooled to ambient temperature, the samples were removed. X-ray analysis of one of the fabricated samples showed the existence of $TiB_2$, alpha $Al_2O_3$, and $ZrO_2$ phases. The density of the fabricated sample was about 2.95 grams/cc. The median pore diameter of the sample was about 99 microns and the total pore volume was about 0.04 cc/grams. This shows that the pore size of this sample was significantly higher than the size measured in Example I. However, it should be noted that the rise in temperature due to the exothermic reaction was 265° C. in this case compared to only 180° C. in Example I. This indicates that larger amounts of exothermic heat (joules/gram) usually leads to larger pore sizes.

EXAMPLE III

Two rectangular plates containing a mixture of 80 wt. % of a mixture comprising:

43.6 wt. % $ZrO_2$, 24.6 wt. % $B_2O_3$ and 31.8 wt. % Al powder and 20 wt. % of a mixture comprising:

80 wt. % $Al_2O_3$ and 20 wt. % $ZrO_2$ were pressed at 25,000 psi. The density of the first green compact plate was 2.37 grams/cc and the density of the second plate was 2.41 grams/cc. The two samples were placed in an alumina crucible which was then, in turn placed in a graphite crucible and put into a furnace to be heated. The furnace was heated in an argon atmosphere. At a temperature of 1016° C., the exothermic reaction took place and the temperature rose to 1168° C. The furnace temperature was then raised to 1600° C. and held at that temperature for one half hour. The furnace was then allowed to cool in an argon atmosphere. The density of the fabricated part was 2.39 grams/cc. X-ray analysis showed the sample to contain $ZrB_2$, alpha $Al_2O_3$, ZrC, and a trace of ZrC. The pore volume was 0.04 cc/gram and the median pore diameter was 0.94 microns. Thus, these pores were much finer compared to those of either Examples I or II. This shows again that a smaller rise in exothermic heat as governed by the reaction generally leads to smaller pore size.

Thus, the invention provides a porous refractory hard metal composition formed by removing the metal compound from a substantially interwoven matrix composition comprising one or more refractory hard metals in an interwoven matrix with a metal compound formed by reacting, in a displacement reaction, a first and second reactant capable of forming a refractory hard metal with a third reactant which forms the metal compound in the interwoven matrix composition. The in situ formation of such an interwoven matrix during the displacement reaction results in substantial uniformity of the dispersion of the refractory hard metal and the metal compound which comprise the interwoven matrix and, thus, the removal of the metal compound results in a substantially uniform porosity throughout the remaining refractory hard metal structure.

The result is a porous material possessing good mechanical strength as well as a high degree of chemical inertness to corrosive materials, even at elevated temperatures, including molten metals such as aluminum and molten salts such as cryolite.

While the invention has been described in terms of preferred embodiments, the claims appended hereto are intended to encompass other embodiments which fall within the spirit of the invention.

What is claimed is:

1. A porous refractory hard metal composition having an average pore size of at least 0.5 microns and a porosity range of from 0.5 to 0.01 cc/gram, wherein said composition is formed from a substantially interwoven matrix composition consisting essentially of a refractory hard metal and a metal compound.

2. The porous refractory hard metal composition of claim 1 wherein said porous refractory hard metal composition is formed from a substantially interwoven matrix composition consisting essentially of a refractory hard metal and a metal compound produced by a displacement reaction.

3. The porous refractory hard metal composition of claim 2 wherein said porous refractory hard metal composition is formed by removing the metal compound from said interwoven matrix composition consisting essentially of a refractory hard metal and a metal compound produced by a displacement reaction, whereby the uniform dispersion of said metal compound in said interwoven matrix results in a substantially uniform porosity upon subsequent removal of said metal compound from said interwoven matrix composition.

4. The porous refractory hard metal composition of claim 1 wherein said composition consists essentially of a metal compound and more than one refractory hard metals.

5. A porous refractory hard metal composition having a porosity range of from 0.5 to 0.01 cc/gram formed by removal of the metal compound from an interwoven matrix composition consisting essentially of a metal compound and one or more refractory hard metals selected from the class consisting of a nitride, boride, carbide, silicide, or sulfide of titanium, zirconium, hafnium, or chromium and mixtures thereof formed by a displacement reaction which results in uniform dispersion of said metal compound throughout said one or more refractory hard metals resulting in substantially uniform porosity in said composition after removal of said metal compound.

6. The porous refractory hard metal composition of claim 5 wherein said composition has a pore size of from 0.5 to 500 microns.

7. The porous refractory hard metal composition of claim 5 wherein said refractory hard metal consists essentially of $TiB_2$.

8. The porous refractory hard metal composition of claim 5 wherein said refractory hard metal comprises $ZrB_2$.

9. The porous refractory hard metal composition of claim 5 wherein said refractory hard metal comprises ZrC.

10. The porous refractory hard metal composition of claim 5 wherein said refractory hard metal consists essentially of a mixture of $TiB_2$ and $ZrB_2$.

11. A method of making a porous refractory hard metal composition which comprises removing the metal compound from a substantially interwoven matrix composition consisting essentially of one or more refractory hard metals and a metal compound formed by a displacement reaction, said removing step comprising immersing said interwoven matrix composition in a molten solvent to remove said metal compound.

12. The method of claim 11 wherein said solvent is maintained at a temperature of from 200° to 1000° C.

13. The method of claim 1 wherein said interwoven matrix composition is maintained in said molten solvent for a period of from 10 to 50 hours.

14. The method of claim 1 wherein said interwoven matrix composition is maintained in said molten solvent for a period of at least 24 hours.

15. The method of claim 1 wherein said interwoven matrix composition is agitated during immersion in said molten solvent.

16. The method of claim 11 wherein said interwoven matrix composition consists essentially of a refractory hard metal and a metal compound consisting essentially of $Al_2O_3$ and said interwoven matrix is immersed in a molten solvent capable of removing said $Al_2O_3$.

17. The method of claim 16 wherein said step of immersing said interwoven matrix composition in a solvent capable of removing said $Al_2O_3$ comprises immersing said composition in molten salt containing fluoride.

18. The method of claim 17 wherein said molten salt comprises cryolite.

19. A method of making a porous refractory hard metal composition which comprises:
    (a) forming a substantially interwoven matrix composition of a refractory hard metal and a metal compound from a mixture comprising first and second reactants capable of reacting to form said refractory hard metal and a third reactant capable of forming said metal compound; and
    (b) immersing said interwoven matrix composition in a molten solvent maintained at a temperature of from 200° to 1000° C. capable of dissolving said metal compound out of said interwoven matrix to form said porous refractory hard metal composition.

20. A method of making a porous refractory hard metal composition having a porosity of from 0.5 to 0.01 cc/gram which comprises:
    (a) forming by a displacement reaction a substantially interwoven matrix composition consisting essentially of:
        (1) a refractory hard metal selected from the class consisting of $TiB_2$, $ZrB_2$, and mixtures thereof; and
        (2) a metal compound consisting essentially of $Al_2O_3$; from a mixture comprising first and second reactants capable of reacting to form said refractory hard metal and a third reactant capable of forming said metal compound; and
    (b) immersing said interwoven matrix composition for a period of from 10 to 50 hours in a molten salt maintained at a temperature of from 200° to 1000° C. and containing cryolite as a solvent capable of dissolving said $Al_2O_3$ metal compound within said interwoven matrix while agitating said interwoven matrix composition to dissolve said metal compound out of said interwoven matrix to form said porous refractory hard metal composition;
whereby dissolving of said metal compound uniformly dispersed throughout said interwoven matrix composition provides a uniform prosity in said resulting porous refractory hard metal composition.

* * * * *